United States Patent
Kärtner et al.

(10) Patent No.: US 6,819,690 B2
(45) Date of Patent: Nov. 16, 2004

(54) MODE-COUPLED LASER

(75) Inventors: Franz Xaver Kärtner, Rheinstetten (DE); Uwe Morgner, Worthstrasse 1 c, Neuburg (DE), D-76776; Thomas Richard Schibli, Boston, MA (US)

(73) Assignees: Franz Xavier Kärtner, Rheinstetten (DE); Uwe Morgner, Neuburg (DE); Universität Karlsruhe, Karlsruhe (DE)

( * ) Notice: Subject to any disclaimer, the term of this patent is extended or adjusted under 35 U.S.C. 154(b) by 0 days.

(21) Appl. No.: 10/149,900

(22) PCT Filed: Dec. 22, 2000

(86) PCT No.: PCT/EP00/13138

§ 371 (c)(1),
(2), (4) Date: Nov. 7, 2002

(87) PCT Pub. No.: WO01/47075

PCT Pub. Date: Jun. 28, 2001

(65) Prior Publication Data

US 2003/0142706 A1 Jul. 31, 2003

(30) Foreign Application Priority Data

Dec. 22, 1999 (DE) .......................................... 199 62 047

(51) Int. Cl.[7] .............................. H01S 3/11; H01S 3/10; H01S 3/098

(52) U.S. Cl. ............................... 372/10; 372/9; 372/18; 372/19; 372/20

(58) Field of Search ........................ 372/9, 10, 18–20, 372/29.02, 29.021, 29.022, 30, 31

(56) References Cited

U.S. PATENT DOCUMENTS 4,665,524 A  5/1987  Cotter ........................... 372/18
5,014,277 A * 5/1991  Van Driel et al. ............. 372/18
5,177,755 A  1/1993  Johnson ......................... 372/38
5,197,073 A  3/1993  Oka ............................. 372/22
5,528,040 A * 6/1996  Lehmann ...................... 250/343
5,757,831 A * 5/1998  Kmetec et al. ................ 372/38
5,856,994 A  1/1999  Hayakawa ..................... 372/75
5,903,358 A * 5/1999  Zare et al. .................... 356/437
5,982,790 A  11/1999  Grossman et al. ............. 372/25
6,038,055 A  3/2000  Hansch et al. ............... 359/279
6,151,343 A  11/2000  Jürgensen ..................... 372/38

FOREIGN PATENT DOCUMENTS

| DE | 42 17 622 A1 | 12/1992 | ............ H01S/3/13 |
| DE | 195 32 648 A1 | 3/1997 | ............ H01S/3/13 |
| DE | 197 50 320 C1 | 4/1999 | ............ H01S/3/10 |
| EP | 0 797 279 B1 | 3/1997 | ............ H01S/3/10 |
| EP | 0 514 758 B1 | 9/2001 | ............ H01S/3/10 |

OTHER PUBLICATIONS

P. Heinz et al.; "Feedback-controlled mode-locking operation of Nd-doped crystal lasers"; Journal of the Optical Society of America; B (Optical Physics), USA.*

Heinz P et al: "Feedback-cotrolled mode-locking operation of Nd-doped crystal lasers" Journal of the Optical Society of America B (Optical Physics), USA.*

(List continued on next page.)

Primary Examiner—Hoanganh Le
Assistant Examiner—Leith A Al-Nazer
(74) Attorney, Agent, or Firm—Baker & Daniels

(57) ABSTRACT

A laser with a decoupling device for emitting a laser output depending on at least one influenceable parameter and a mode-coupling device for coupling a plurality of the laserable modes of the resonator. A detector is provided for detecting a value related to the emitted laser output and a parameter varying means for varying the at least one parameter in response to the detected value.

21 Claims, 2 Drawing Sheets

OTHER PUBLICATIONS

Marano M. et al.: "Optoelectronic Feedback Loop For Intensity Noise Suppression in a High Bit Rate FM–operated Er–Yb Laser", Electronic Letters, Oct. 14, 1999, Bd. 35, Nr. 21, pp. 1877–1878.

Heinz P. et al.: "Feedback–Controlled Mode–Locking Operation of Nd–Doped Crystal Lasers" Journal of Optical Society of America, Bd. 7, Nr. 2, Feb. 1990.

Andreeva A.I., et al.: "Passively Mode–Locked YAG:Nd Laser with a Negative Feedback Loop Based on a High-–Current Photomultiplier" Soviet Journal of Quantum Electronics, Bd. 19, Nr. 8, Aug. 1989.

Honninger C. et al.: "Q–Switching Stability Limits of Continuous–Wave Passive Mode Locking" Journal of Optical Society of America , Bd. 16, Nr. 1, Jan. 1999.

Schibli T.R. et al.: "Control of Q–Switched Mode Locking by Active Feedback", Optics Letters, Feb. 1, 2001, Bd. 26, Nr. 3, pp. 148–150.

Schibli, T.R. et al.: "Control of Q–Switched Mode Locking by Active Feedback", CLEO 2000—Conference on Lasers and Electro–Optics, vol. 39, Paper CTHD6, May 2000, pp. 407–408.

C.C. Harb, M.B. Gray, Member, IEEE, H.–A. Bachor, R. Schilling, P. Rottengatter, I. Freitag, and H. Welling, "Suppression of the Intensity Noise in a Diode–Pumped Neodymium: YAG Nonplanar Ring Laser", IEEE Journal of Quantum Electronics, vol. 30, No. 12, Dec., 1994, pp. 2907–2913.

I. Freitag, "Intensity Noise of Diode–Pumped Solid–State Lasers II) Techniques for Noise Reduction", Laser–Forschung, Jul. 10, 1996, pp. 56–61.

R.J. Dwayne Miller, Lixing Min, Michael A. Shragowitz, "Efficient Operation of a Cavity Dumped Q–Switched and Mode–Locked Yag Laser", Optics Communications, vol. 62, No. 3, May 1, 1987, pp. 185–189.

Thomas J. Kane, "Intensity Noise in Diode–Pumped Single-–Frequency Nd: YAG Lasers and its Control by Electronic Feedback", IEEE Photonics Technology Letters, vol. 2, No. 4, Apr. 1990, pp. 244–245.

Daniel J. Gauthier, "Controlling lasers by use of extended time–dealy autosynchronization", Optics Letters, vol. 23, No. 9, May 1, 1998, pp. 703–705.

Th. Graf, A.I. Ferguson, E. Bente, D. Burns, M.D. Dawson, "Multi–Watt Nd: YVO4 laser, mode locked by a semiconductor saturable absorber mirror and side–pumped by a diode–laser bar", Optics Communications 159 (1999) pp. 84–87, Jan. 1, 1999.

* cited by examiner

MODE-COUPLED LASER

BACKGROUND OF THE INVENTION

The invention relates to lasers, especially passively mode-coupled, continuously operated lasers.

Lasers generally have a so-called optical resonator and an amplification medium. In the most simple case, the optical resonator consists of mirrors designed and oriented such that a light wave can continuously be reflected back and forth between them. Similar to a vibrating string, this is not possible with just any light wave, only with certain specific ones defined by the resonator. They are referred to as resonator modes.

The emission of laser light causes the withdrawal of energy from the light wave in the resonator. In order to compensate such losses the light wave passes through the amplification medium provided in the resonator. Each amplification medium intensifies the light only in a certain wavelength range. Therefore, the laser can only emit light which is both continuously reflected back and forth, thus equivalent to a resonator mode, and which is efficiently amplified at the same time. Consequently, only the light from selected resonator modes is emitted.

When the light wave passes through the amplification medium, it takes energy away from the latter, which has to be supplied again, "pumped" back in from the outside. If the energy is not supplied to the amplification medium as quickly as it is removed when the light wave passes through, a pulse-like laser operation can ensue.

Such a macropulse will not occur until sufficient energy can be withdrawn from the amplification medium.

Frequently, the emission of especially short light pulses is desired. This can be achieved when as many modes as possible occur virtually simultaneously, overlaying each other such that the desired short pulse is obtained.

This can be achieved by means of the so-called mode-coupling, which ensures that when a first of the resonator modes begins to build up, others will follow. In practical application, an element can be provided in the resonator, for example, which absorbs or reflects to varying degrees depending on the strength of the incident light. A known such element is a so-called saturable semiconductor absorber mirror; see U. Keller, K. J. Weingarten, F. X. Kärtner, D. Kopf, B. Braun, I. D. Jung, R. Fluck, C. Hönninger, N. Matuschek and J. Aus der Au "Semiconductor Saturable Absorber Mirrors (SESAMs) for Femtosecond to Nanosecond Pulse Generation in Solid-State Lasers, IEEE Journ. of selected topics in Quantum Electronics, vol. 2, No. 3, September 1996, page 435. The reflectivity of said element increases when the incident light becomes more intense. The result of such an element in the resonator is that whenever the light wave pertaining to a first resonator mode is especially strongly reflected, this will also be the case with other resonator modes. Therefore, the resonator modes are said to be coupled, and accordingly this is referred to as mode-coupling.

A problem in many applications is that a number of interferences or impairments and/or instabilities can occur with common lasers, including the so-called Q-switching (i.e. the development of macropulses), relaxation oscillations and spiking (switching instabilities). In particular, this results in a very high fluctuation in the average laser output. Such interferences can occur under certain operating conditions, for example at a certain pumping power. The fluctuation typically has frequencies ranging between 10 kHz and a few megahertz. The fluctuations can also occur non-periodic, i.e. irregularly, which is especially troublesome. Moreover, the sudden very high intensities in the resonator can destroy or shorten the lifetime of the resonator-internal or other components.

This is especially problematic with passive continuously mode-coupled lasers, lasers with resonator-internal frequency shift and/or resonator-internal frequency doubling and/or lasers where only every nth pulse is coupled out, which then has a nth times higher pulse energy. The latter lasers are called "cavity-dumped" lasers.

Such fluctuations, i.e. the lack of or insufficient potential for adequate stabilization in a technically relevant range, are often the reason why the use of the lasers, i.e. laser systems, is highly limited, why certain applications are not available at all and/or why certain lasers cannot operate in certain operating modes, such as continuous wave operation or mode-coupled continuous wave operation (cw mode locking). Applications worth mentioning, for example, are related to telecommunications, material processing, optical scanning (sampling), etc., which were previously not available, at least in part.

On the other hand, there are applications where it is desired to decouple pulses with an especially high pulse power from the laser.

Other problems occur when the time sequence of the individual pulses has to remain stable, especially in Q-switched laser systems.

The prior art includes various approaches to solve the above problems, but they have to be considered inadequate.

For example, in "Semiconductor nonlinearities for solid-state laser mode-locking and Q-switching" (Nonlinear Optics in Semiconductors II and Semimetals, vol. 59, 211–285, 1999), U. Keller provides an example of how maximum energy can be coupled out of the pulse string of a mode-coupled laser by means of controlled Q-switching.

Other attempts were made by setting various parameters that co-define the laser emission so as to allow a stable continuous mode-coupled laser, i.e. laser system operation, at least in certain ranges of the available pumping power. Among others, the laser materials, amplification media, absorber systems, laser mode cross-sections, etc. were varied. For example, we are referring to E. R. Thoen, E. M. Koontz, M. Joschko, P. Langlois, T. R. Schibli, F. X. Kärtner, E. P. Ippen, L. A. Kolodziejski in "Two-photon absorption in semiconductor saturable absorber mirrors", Appl. Phys. Lett. 74, 3927–3929, 1999, relating to special nonlinear absorber elements.

One problem, which remains unsolved by the above approaches, is that stabilization is achieved only within a limited parameter range of the systems. This can have a negative effect when the laser is turned on and/or powered up and in longer operation.

Furthermore, the proposed absorption processes, for example the two-photon absorption, restrict the maximum achievable pulse energy, for example. The absorbers are exposed to very high stresses and the lifetime is limited because of the high saturation which accompanies the deposition of high outputs in the material.

The aim of the invention is to provide an innovation for industrial application.

SUMMARY OF THE INVENTION

In accordance with a first substantial aspect of the invention, it is proposed for a laser with a decoupling device for emitting a laser output depending on at least one influenceable parameter and a mode-coupling device for coupling a plurality of the laserable modes of the resonator, to provide a detector for detecting a value related to the laser output, especially the emitted laser output, and a parameter varying device for varying the at least one parameter in response to the detected value.

By means of the claimed method even high-frequency fluctuations can be controlled. Therefore, for the first time it was found that with the above type of laser systems high-speed instabilities, especially Q-switching instability, spiking and relaxation oscillations can be controlled to the net laser gain by means of coupling the laser output. This applies to very broad operating ranges. Said very broad operating ranges began, at least in substantial practical exemplary embodiments of the invention, at or at least close to the laser threshold and extended, especially continuously, up to a significant laser output where both the emitted output and the supplied pumping power represented a multiple of the respective output just above the laser threshold.

The invention allows higher repetition rates than previously. Furthermore, higher pulse energies than before can be set in continuous mode-coupled operation, because the beam cross-section in the amplification medium and/or on the saturable absorber can be set higher without risking undesired Q-switching.

For a practical implementation of the invention, it is proposed to vary a parameter influencing the internally circulating and/or the decoupled laser output. A substantial advantage is that in many existing systems no or no significant modifications are required in the optical structure or the resonator.

It should be noted that the above allows a stabilization of the laser output and, if instead of a parameter variation with negative feedback effect, the parameter is varied so as to have positive feedback, a specific destabilization can be achieved.

It should be noted that the parameter variation can also be used for initiating a mode-coupling process in that the parameter varying device is supplied with a suitable trigger pulse.

The latter is especially advantageous for intensifying a Q-switching instability. Such a specific influence on the Q-switching instability can be used for emitting the high pulses generated by Q-switching at certain times. With the aid of an approximately quartz-stabilized signal generator a stable repetition rate can be obtained. The generator signals and the detected value that is representative for the laser output are preferably added in this case. Considerably higher pulse energies and/or repetition rates than those commonly possible can be achieved.

According to an especially preferred example the, or one of the parameters influencing the decoupled laser output is the pumping power. In this case, the influence on the parameter, especially the control, can be implemented especially easily and by means of a substantially purely electronic modification of common laser systems. Therefore, especially in diode-pumped laser systems said variant is particularly easily implemented, because in this case, only the pump current supplied to the laser pump diodes has to be modified. Alternatively, a loss modulation can take place, which means a loss modulator is provided within the resonator whose loss is varied in response to the detected value.

It is possible and preferable to design the parameter varying device such that it varies the parameter so as to even out the emitted laser output, not only the laser output circulating in the resonator.

According to a preferred variant, the control can be such that the parameter varying device evens out the output averaged over at least one resonator roundtrip time. This is possible even when the control works comparatively slowly, especially compared to the resonator roundtrip time, for example because a slow and therefore quasi integrating photo-element is used for detecting the value related to the laser output. A means for integrating and/or averaging high-speed variations of the value related to the laser output is then provided, where the parameter varying device is then designed to vary the parameter in response to the averaged and/or integrated value.

It is possible and preferable to stabilize the output to less than 5 to 10% of the variations occurring without stabilization. According to an especially preferred exemplary embodiment a stabilization of clearly better than 1% was achieved.

The parameter can be varied by different methods in response to the deviation of the detected value from a target value. Especially linear variations relative to the deviation are possible. Alternatively, PID (proportional, integral and/or differential) behaviors can be realized and/or a nonlinear variation can be achieved.

According to a preferred variant, mode-coupling is passive, for example via an element in the resonator which absorbs and/or reflects depending on the output.

Especially an at least partially saturable absorber can be provided, for example.

It is possible that the resonator is provided with a resonator-internal frequency doubler and/or that a loss modulator is provided whose loss is the, or one of the variable parameters. Such a loss modulator can be modulated especially mechanically, acoustically, optically and/or electrooptically. Providing a loss modulator is especially preferred in the laser systems in which the pumping power cannot be varied particularly easily.

The laser can be a system which exhibits spiking behavior if the at least one parameter is not varied in response to the detected value, and/or a system designed for cavity dumping.

The invention also claims a method, for stabilizing a laser with a mode-coupling means for coupling a plurality of the laserable modes of the resonator and a detector for detecting a value related to the emitted laser output and a parameter varying device for varying the at least one parameter in response to the detected value, including the following steps: a value representative for the emitted laser output is detected and the laser output is controlled by varying the at least one parameter such that the emitted laser output evens out.

BRIEF DESCRIPTION OF THE DRAWINGS

The invention is described below by means of only one example shown in the drawings, as follows.

DETAILED DESCRIPTION

Figure 1:
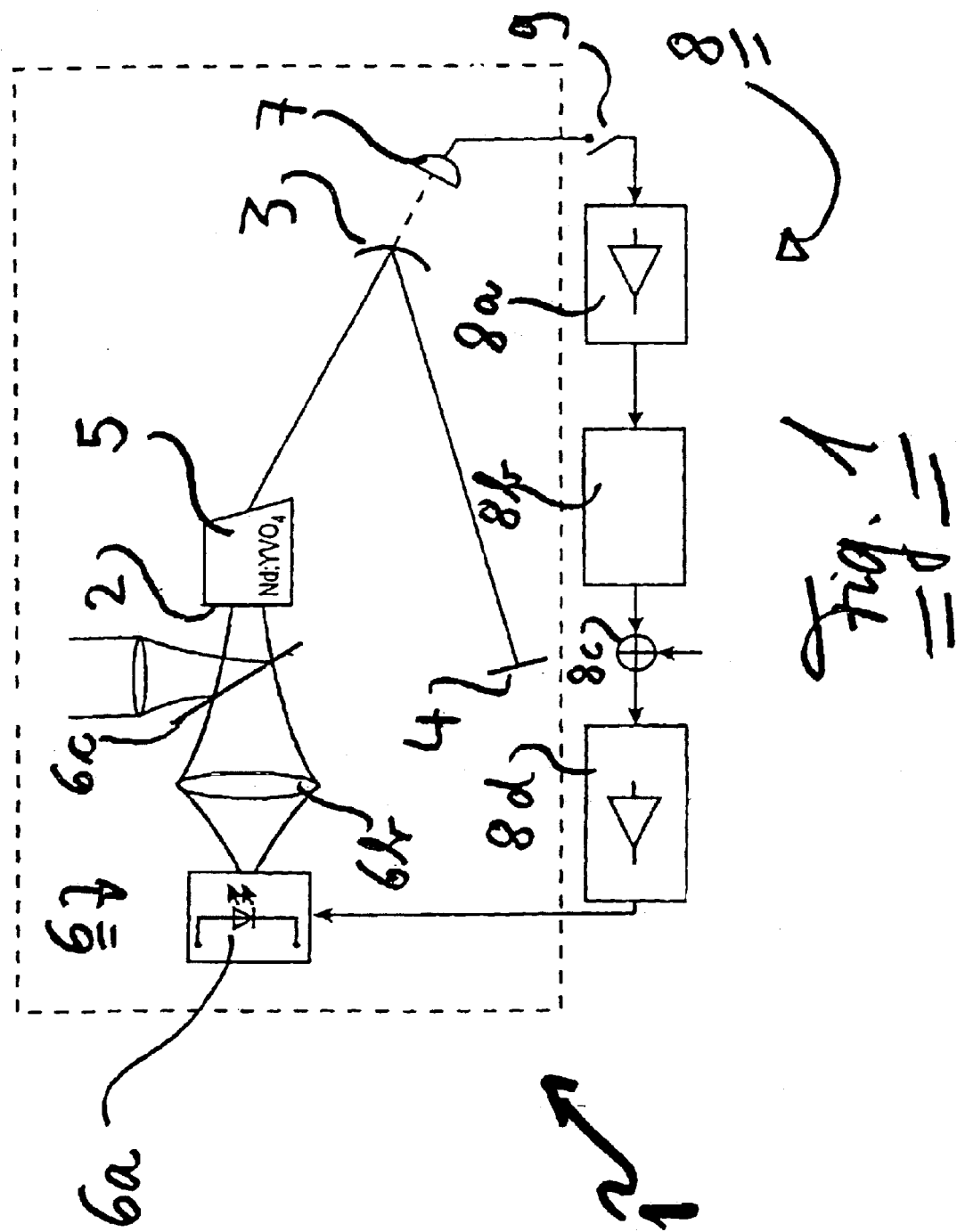
FIG. 1 is a laser arrangement of the invention.

According to FIG. 1, a laser 1, generally identified by 1, comprises a resonator formed by mirrors 2, 3, 4, and an amplification medium 5, which is pumped through a pumping device 6. The laser 1 also comprises a detector 7 for detecting a value related to the laser output and a parameter varying device 8 for varying at least one parameter that influences the laser output in dependence of the value related to the laser output.

The mirror 2 is a metal coating applied to the amplification medium 5, which is partially transparent for the laser light with approx. 2% and transparent for the pump light from the pumping device 6 and which serves as an output coupler via which a portion of the light waves building up in the resonator can be coupled out and supplied to where they are used.

The mirror 3 is a spherical dielectric mirror and has a reflection of approx. 99.9%. The spherical curvature of the dielectric mirror 3 is selected such that stable resonator modes are able to develop.

The end mirror 4 is a saturable absorber mirror for mode-coupling. The roundtrip time through the resonator is approx. 10 ns.

The amplification medium 5 is formed by a Nd:YVO$_4$ crystal. The fluorescence lifetime of the laser crystal is approx. 100 $\mu$s.

The pumping device 6 comprises a series of (semiconductor laser) pump diodes 6a configured so as to emit light through a focusing lens 6b, a dichroic plate 6c and the decoupling mirror 2 focused on the Nd:YVO$_4$ crystal that forms the amplification medium 5. The dichroic plate 6c stands diagonal in the beam and is selected such that the pumping light passes through and the laser light is reflected.

In accordance with the invention, the detector 7 for the laser output in the resonator is a photo-detector 7, on which a portion of the small amount of light passing through the dielectric mirror is irradiated. The output signal from the photo-detector 7 is supplied to a signal conditioning via a switch 9 provided for experimental purposes. At the input, the signal conditioning comprises a signal amplifier 8a whose output is guided to a PH) member 8b so as to emit a parameter varying signal in response to a deviation of the signal amplified by the signal amplifier 8b from a target value that is also supplied to the PID member 8b. Said parameter varying signal comprises a portion which is proportional to the deviation, a portion integrating the deviation and a portion corresponding to a time variation of the deviation.

The output signal from the PID member 8b is supplied to an adder 8c where it is added to a desired correcting variable, which is representative for a preset pump current. The output signal from the adder 8c is supplied to a current amplifier 8d feeding the laser pump diodes 6a.

Figure 2:
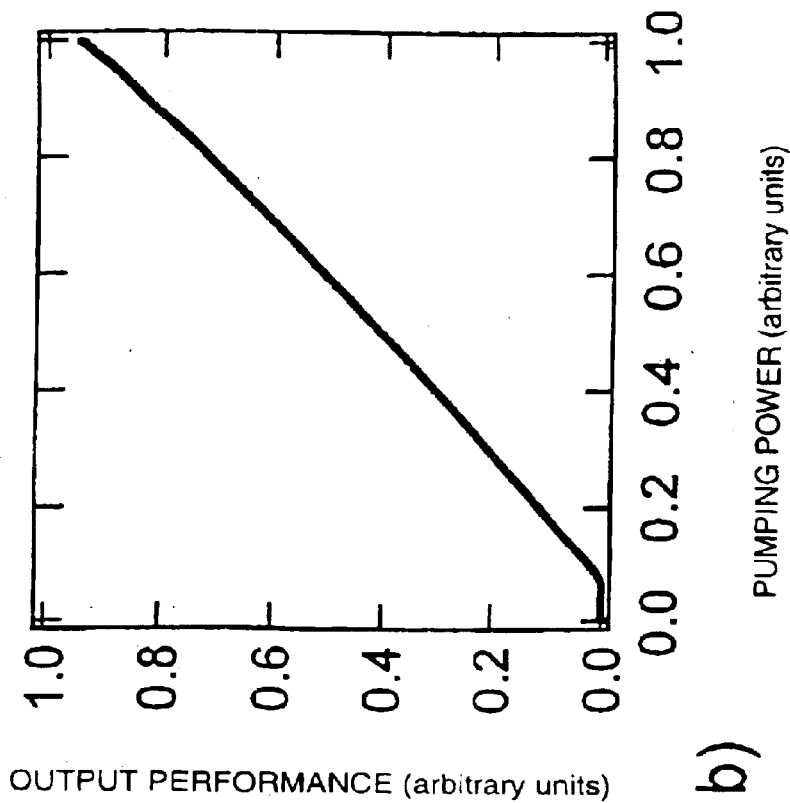
In FIG. 2 the emitted laser output is plotted against the supplied pumping power with and without the stabilization of the invention.
Figure 2:
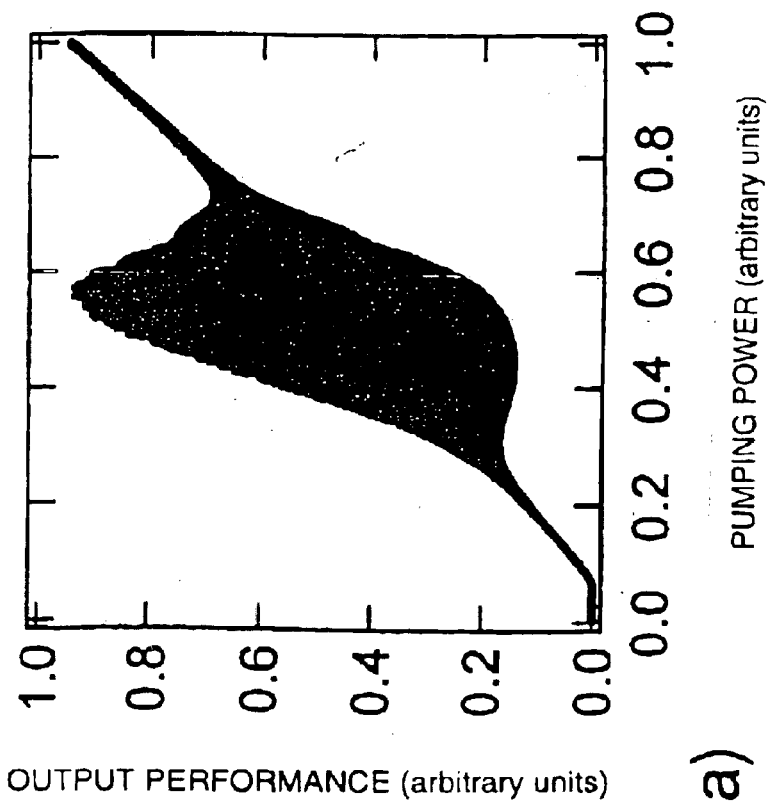

The laser of the disclosed embodiment of the invention operates as follows: First, a desired pump current is set while the switch 9 is open and the emitted laser output in the decoupled beam is measured. Varying the pump current will result in very high variations in certain ranges of the pump current, as shown in FIG. 2a.

The switch 9 is now closed so that the laser light output is stabilized by varying the pump current with a closed loop. Again, the emitted laser output in the decoupled beam is measured. A variation of the pump current will result in the curve of FIG. 2b, which has a substantially smaller width in all ranges than the curve in FIG. 2a. This means that the emitted laser light is emitted substantially evenly and without sudden fluctuations. In particular, a laser output is obtained which is at least substantially constant averaged over the resonator roundtrip time.

It should be noted that the invention is by no means limited to lasers with a Nd:YVO$_4$ amplification medium, which is merely used as an example. It is useable with all types of amplification media, especially Y$_3$Al$_5$O$_{12}$, to mention another example.

Therefore, the invention opens up a number of new areas of application, such as material processing, for example drilling or laser cutting holes, telecommunications, signal sampling, i.e. signal scanning, etc.

What is claimed is:

1. A passively mode-coupled, continuously operated laser, comprising:
    a passive mode coupling means;
    a device for high-speed active Q-switching instability control and mode coupling of the laser;
    wherein for continuous passive mode coupled laser operation in a continuous pumping power supply range, said device includes a detection means for detecting a value related to the laser output and means for varying at least one parameter influencing the laser output in dependence on said detected value.

2. The laser of claim 1 including a resonator and a decoupling means for emitting the laser output depending on at least one influenceable parameter, said decoupling means coupling a plurality of modes of the resonator, wherein for mode-coupled continuous laser operation the detection means detects a value related to the laser output and said parameter bearing means vary said at least one parameter in dependence on the value related to the laser output.

3. The laser as defined by claim 2, characterized in that the parameter varying means is designed to vary the parameter such that the laser output evens out stably, averaged over at least one resonator roundtrip time.

4. The laser of claim 1 including a laser medium having lifetimes of at least 1 $\mu$s.

5. The laser of claim 1 including a laser medium having lifetimes of at least 10 $\mu$s.

6. The laser of claim 1 including a laser medium having lifetimes above 50 $\mu$s.

7. The laser as defined by claim 1, characterized in that the parameter varying means is designed to even out the output over time in the range of one resonator roundtrip time.

8. The laser as defined by claim 1, characterized in that the parameter varying means is designed to even out the output averaged over a resonator roundtrip time to better than 10%.

9. The laser as defined by claim 1, including a means for integrating and/or averaging high-speed variations of the value related to the laser output and the parameter varying means is designed to vary the parameter in response to the averaged and/or integrated value.

10. The laser as defined by claim 1, characterized in that the parameter varying means is designed to vary the parameter in response to the deviation of the detected value from a target value.

11. The laser as defined by claim 1, characterized in that the parameter varying means is designed to vary the parameter with proportional, differential and/or integral behavior relative to the deviation of the detected value from a target value.

12. The laser as defined by claim 1, including an element that absorbs and/or reflects in dependence of the output.

13. The laser as defined by claim 1, including an at least partially saturable absorber as an absorbing and/or reflecting element.

14. The laser as defined by claim 1, wherein the at least one parameter is the supplied pumping power.

15. The laser as defined by claim 1, including a resonator-internal frequency doubler.

16. The laser as defined by claim 1, including a loss modulator whose loss can be modulated as a variable parameter mechanically, acoustically and/or electrooptically.

17. The laser as defined by claim 1, including at least one light-sensitive element as a detection means for detecting the laser output.

18. The laser as defined by claim 1 which has spiking behavior if the at least one parameter is not varied in response to the detected value.

19. A passively mode-coupled, continuously operated laser, comprising:
  decoupling means for emitting a laser output dependent on at least one influenceable parameter;
  means for resonance cavity dumping;
  detection means for detecting a value related to the emitted laser output; and
  parameter varying means for varying the at least one parameter in response to the detected value.

20. In a passively mode-coupled, continuously operated laser having a resonator and a means for passively coupling a plurality of the modes of the resonator, a method for stabilizing the laser comprising:
  detecting a value related to the laser output, and
  controlling the laser output by varying at least one parameter in response to the detected value such that the laser output that is emitted as evenly mode-coupled pulses evens out.

21. In a passively mode-coupled, continuously operated laser having a resonator and a means for passively coupling a plurality of the modes of the resonator, a method for stabilizing the laser comprising:
  detecting a value related to the laser output, and
  controlling the laser output by varying at least one parameter in response to the detected value by initiating mode-coupling by pulse-like variation at least of the at least one parameter.

* * * * *